UNITED STATES PATENT OFFICE.

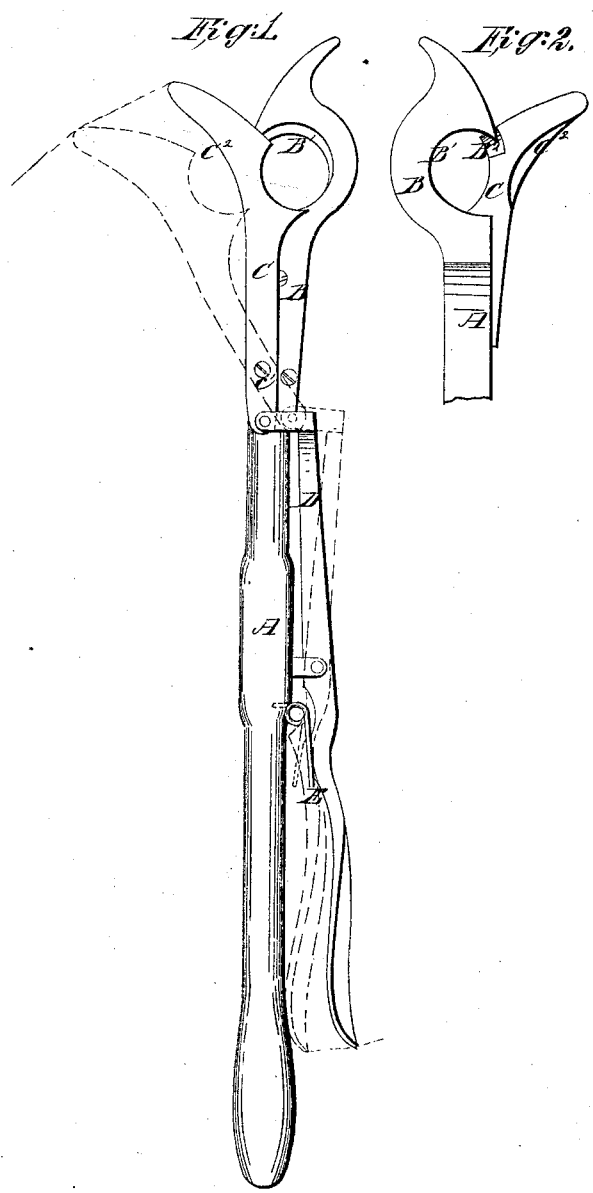

JAMES GUCKIAN, OF CAMDEN, OHIO.

IMPROVEMENT IN IMPLEMENTS FOR STRIPPING AND CUTTING SORGHUM.

Specification forming part of Letters Patent No. 56,406, dated July 17, 1866.

*To all whom it may concern:*

Be it known that I, JAMES GUCKIAN, of Camden, in the county of Preble and State of Ohio, have invented a new and useful Improvement in Instruments for Stripping and Cutting Sorghum; and I do hereby declare that the following is a full, clear, and exact description of the construction and operation of the same, reference being had to the annexed drawing, made part of this specification, in which the said instrument is represented by side elevations.

The object of my invention is to provide an implement by which the leaves may be cut from the stalks of the *Sorghum saccharum* and similar plants, and the stalks themselves be either cut or allowed to remain in the field standing.

It is observed that the frost does not readily affect the stalks of the sorghum, but that the leaves are exceedingly susceptible to its influence. When these are killed by the frost the influence extends to the joints of the cane, which is made bitter and unfit for use. It becomes necessary then to remove the leaves, when the stalks may be allowed to remain for a considerable length of time in the field after the early frosts without being injured.

It is to meet the wants of the farmer requiring an implement to cut and strip, or to strip without cutting, and at the same time of convenient application to use, that this instrument is designed.

A is the handle, which I make of wood, to the extremity of which is attached rigidly the blade B. The shape of this is represented in the drawing, the portions concealed by the other parts of the implement being indicated by dotted lines. The inner rim of the hooked portion of the blade B is made sharp, as shown at B'. The blade C, also shaped as shown, is pivoted to the blade B and the handle at C', so as to have the motion indicated by the red lines in Figure 1.

D is a lever, pivoted near its center to the handle at $D^2$, and to the end of blade C at D'. This lever is so formed that it may rest centrally and longitudinally upon the handle, and at the same time be attached to the blade C.

A spring, E, attached to the handle, presses outward against the handle of the lever D, so that by the tension of the spring the blade C is kept closed with the blade B, except when it is separated by pressing the end of the lever toward the handle, as indicated by the red lines in Fig. 1.

The blade C is sharpened upon its exterior edge, as shown at $C^2$, and its point rests upon the shoulder formed by beveling the edge of the blade B at $B^2$.

In operating with this implement, the jaws being opened by pressing upon the lever, the stalk is received between them near the top, and then, by drawing the blades down by the handle, the leaves or blades of the cane are separated from the stalk. The stalk may be cut at the foot by drawing the sharp edge B' against it, when, the stalk being taken in the left hand, the small end is severed by striking it with the edge $C^2$. If it is designed to strip but not cut the cane, the stalk may be disengaged by opening the jaws, as before.

What I claim as my invention, and desire to secure by Letters Patent, is—

An implement for stripping and cutting sorghum, and other analogous uses, constructed with a fixed blade, B, a movable blade or jaw, C, and a lever, D, or its equivalent, said parts being respectively constructed, and the whole combined for use, substantially as set forth.

In testimony whereof I have signed my name to this specification in the presence of two subscribing witnesses.

JAMES GUCKIAN.

Witnesses:
JOHN S. HOLLINGSHEAD,
B. C. MAJOR.